(12) United States Patent
Fruge et al.

(10) Patent No.: US 7,042,681 B1
(45) Date of Patent: May 9, 2006

(54) DOVETAILS FOR POSITIVE RETENTION IN AN OVER-MOLDED ACTUATOR

(75) Inventors: Tave Fruge, Louisville, CO (US); Todd Morton, Longmont, CO (US); Dave Brause, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 194 days.

(21) Appl. No.: 10/407,977

(22) Filed: Apr. 3, 2003

Related U.S. Application Data

(60) Provisional application No. 60/371,226, filed on Apr. 8, 2002.

(51) Int. Cl.
*G11B 5/54* (2006.01)
(52) U.S. Cl. .................................. 360/265.8
(58) Field of Classification Search ............ 360/97.01, 360/98.01, 264, 264.1, 264.3, 264.7, 265, 360/265.7, 265.8
See application file for complete search history.

(56) References Cited

U.S. PATENT DOCUMENTS

| | | | |
|---|---|---|---|
| 5,122,703 A | | 6/1992 | Takahashi et al. ............ 310/36 |
| 5,168,184 A | | 12/1992 | Umehara et al. ............ 310/13 |
| 5,168,185 A | | 12/1992 | Umehara et al. ............ 310/15 |
| 5,407,367 A | * | 4/1995 | Robertson ................... 439/716 |
| 5,477,518 A | * | 12/1995 | Hiatt ........................... 720/654 |
| 5,600,516 A | * | 2/1997 | Phillips et al. ........... 360/265.1 |
| 5,656,877 A | * | 8/1997 | Loubier ....................... 310/13 |
| 5,734,528 A | * | 3/1998 | Jabbari et al. ............. 360/265 |
| 6,061,206 A | * | 5/2000 | Foisy et al. .............. 360/265.7 |
| 6,252,746 B1 | * | 6/2001 | Cho ........................ 360/265.8 |
| 6,307,717 B1 | * | 10/2001 | Jeong ....................... 360/265.8 |
| 6,397,699 B1 | * | 6/2002 | Ikemoto et al. .......... 74/490.01 |
| 6,404,596 B1 | * | 6/2002 | McReynolds et al. ... 360/265.8 |
| 6,683,756 B1 | * | 1/2004 | Zhao et al. .............. 360/265.8 |
| 6,787,941 B1 | * | 9/2004 | Takashima ................... 310/12 |
| 6,867,950 B1 | * | 3/2005 | Lin ......................... 360/265.8 |
| 2003/0179503 A1 | * | 9/2003 | Choi .......................... 360/265 |
| 2004/0075949 A1 | * | 4/2004 | Dague et al. ............ 360/265.8 |

* cited by examiner

*Primary Examiner*—Jefferson Evans
(74) *Attorney, Agent, or Firm*—Sheridan Ross P.C.

(57) ABSTRACT

Positive retention features are provided on an actuator of a magnetic disk drive thereby increasing the structural rigidity of the actuator in attachment of a voice coil to the actuator. The positive retention features are defined by a plurality of protrusions having compound curved shapes including reverse or inward facing edges. The natural tendency of thermoplastic resin to shrink during cooling is used to an advantage in enhancing the rigidity of the connection between the voice coil and actuator body. The compound curved shapes of the positive retention features allows shrinkage of the thermoplastic resin in multiple directions around the features thereby maintaining desired actuator stiffness.

14 Claims, 3 Drawing Sheets

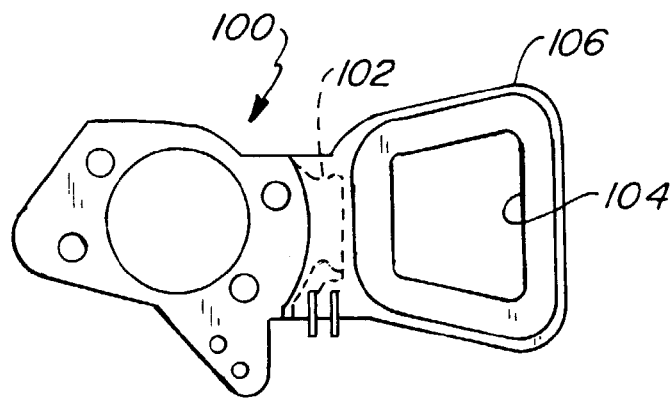
Fig_1
(PRIOR ART)
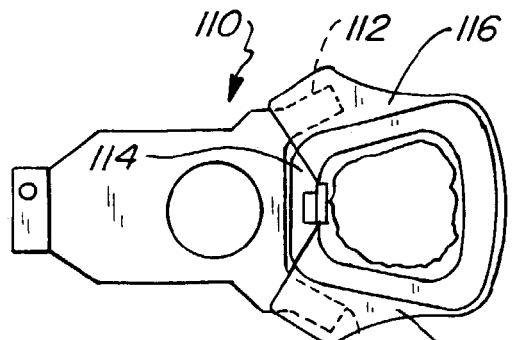
Fig_2
(PRIOR ART)
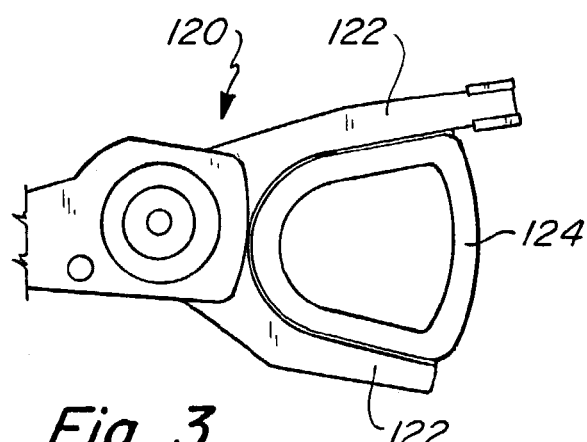
Fig_3
(PRIOR ART)
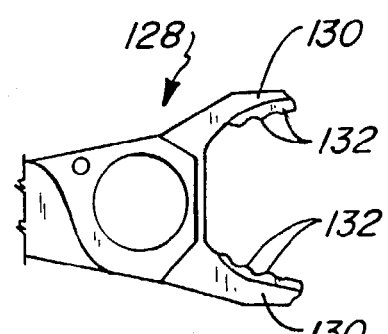
Fig_4
(PRIOR ART)
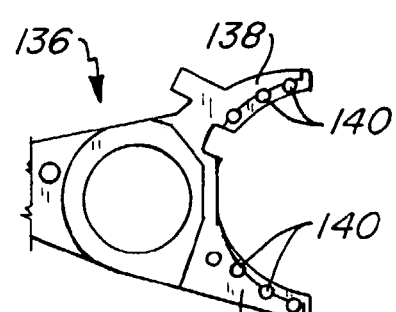
Fig_5
(PRIOR ART)

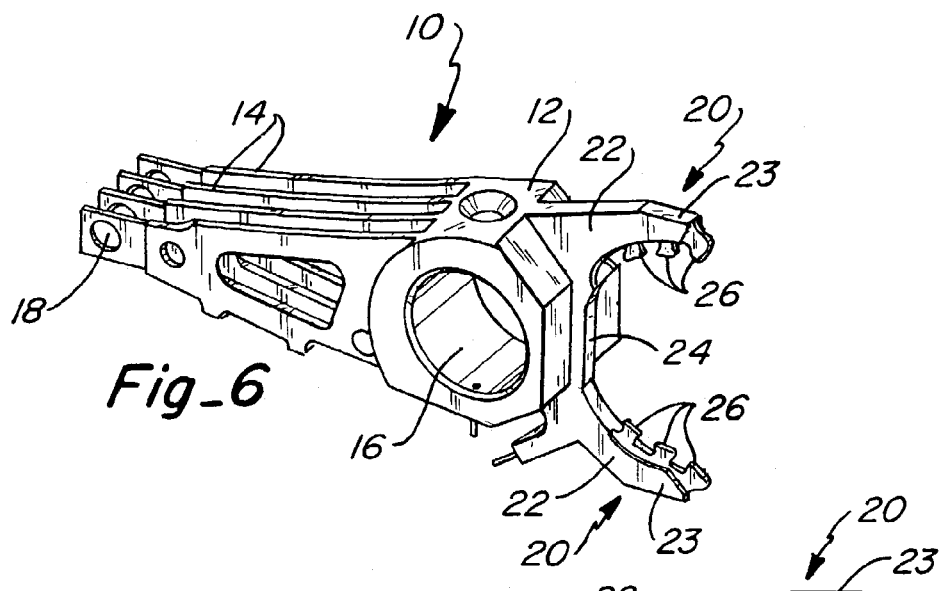
Fig_6
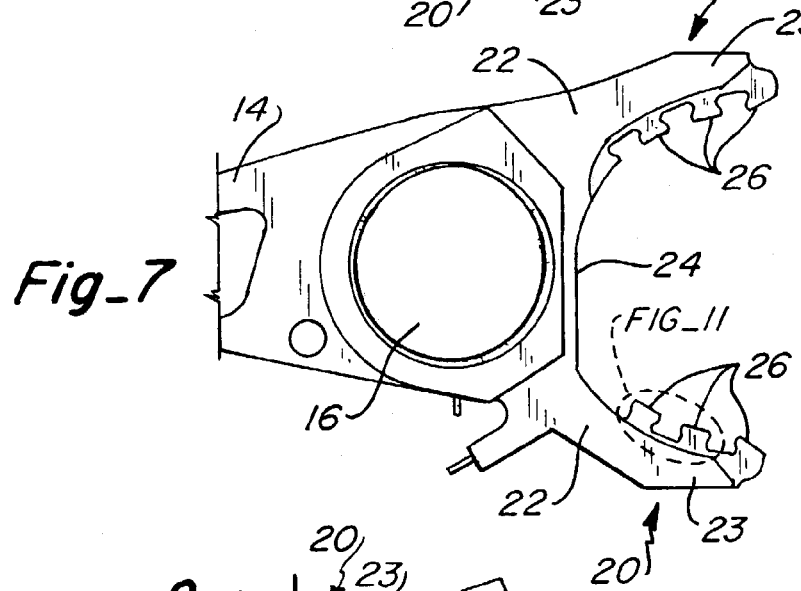
Fig_7
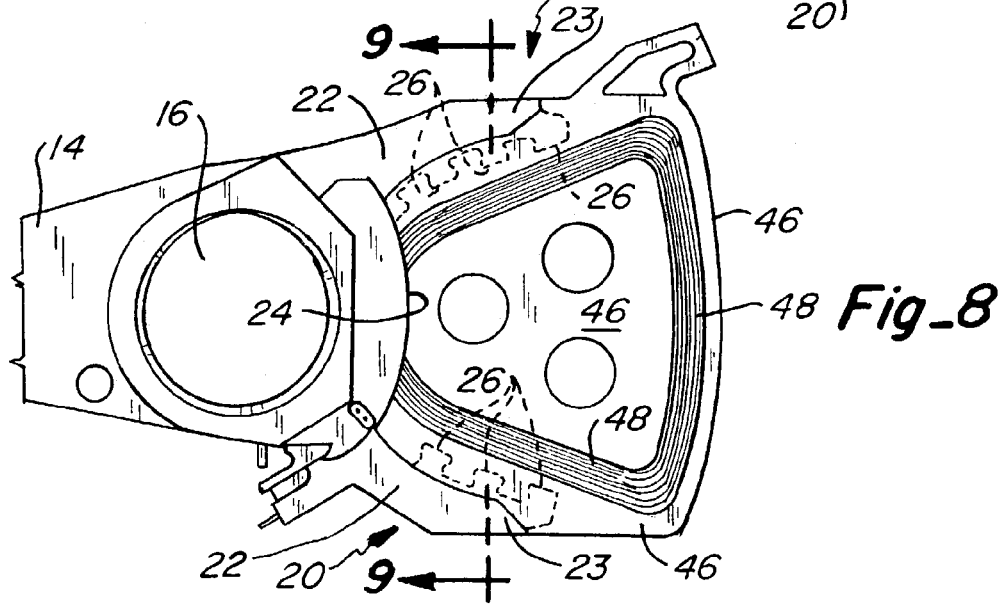
Fig_8

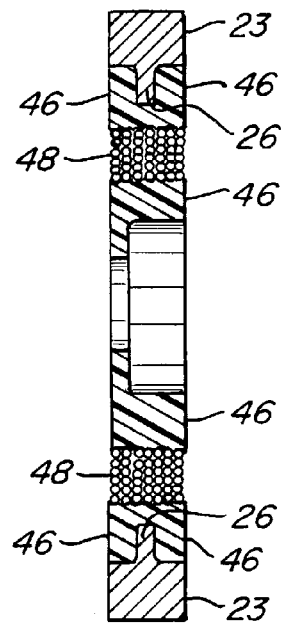
Fig_9
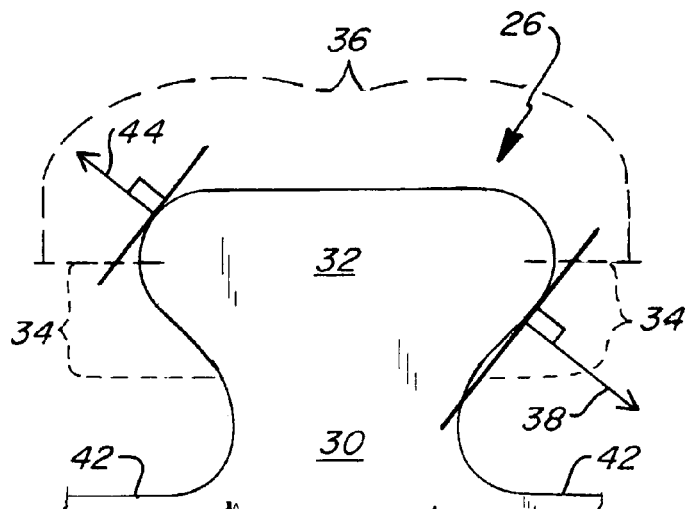
Fig_10
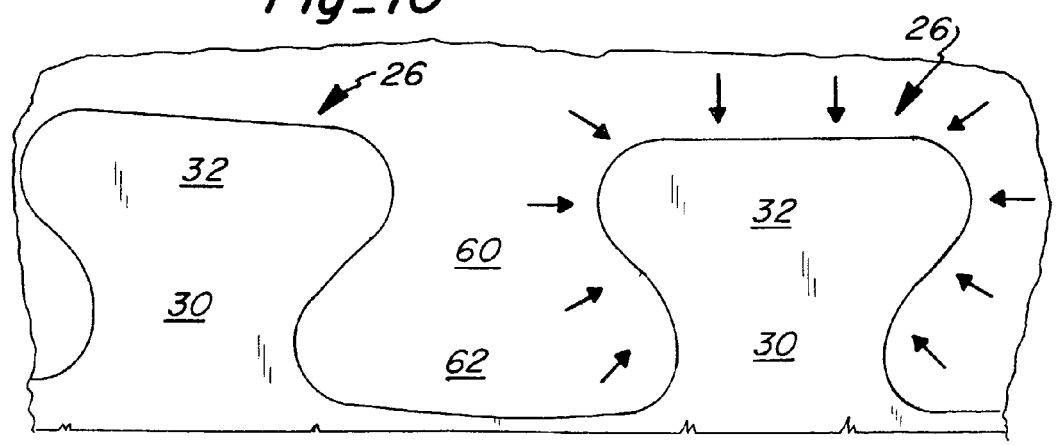
Fig_11

DOVETAILS FOR POSITIVE RETENTION IN AN OVER-MOLDED ACTUATOR

CROSS-REFERENCE TO RELATED APPLICATIONS

Priority is claimed from U.S. Provisional Patent Application Ser. No. 60/371,226 filed on Apr. 8, 2002, and entitled "DOVETAILS FOR POSITIVE RETENTION IN AN OVER-MOLDED ACTUATOR" the disclosure of which is incorporated herein by reference in its entirety.

FIELD OF THE INVENTION

The present invention relates to an actuator used in a magnetic disk drive, and more particularly, to an actuator incorporating positive retention features for enhancing the attachment voice coil to the actuator which allows for a superior servo system capable of achieving higher drive capacities.

BACKGROUND OF THE INVENTION

Rotary type actuators are commonly used for positioning magnetic read/write heads on recording tracks of a magnetic disk. Exact positioning of the actuator to ensure proper tracking of the magnetic read/write heads is of paramount concern in producing a quality disk drive. As track densities increase, the construction of the actuator must be capable of providing consistent and reliable positioning. In many disk drive systems, the construction of an actuator assembly may include multiple actuator arms and multiple suspensions which position corresponding multiple read/write heads on a disk pack having multiple magnetic disks. Because of the increased size of such an actuator assembly, one continuing concern in the design of such an assembly are the vibrational characteristics of the actuator assembly. The actuator assembly should be of a design that limits undesirable actuator vibration. Providing the requisite stiffness in an actuator assembly is often difficult because of a number of design limitations to include the inability to integrally mold or extrude each component of the actuator. For example, a voice coil must be attached to the actuator assembly, typically by an over-molded thermoplastic resin. Because the resin and voice coil cannot be integrally molded or extruded with the body of the actuator assembly, complex vibrational variables are introduced in operation of the actuator assembly. Thus, one inherent problem in use of any type of thermoplastic resin to attach the voice coil is that the thermoplastic resin itself has a lower modulus than the metallic actuator assembly thereby reducing actuator stiffness.

Another inherent problem in use of any type of thermoplastic resin used to join a voice coil and actuator is that thermoplastic resin will shrink in size as the molten plastic cools after molding. In most circumstances, the over-molded resin has a tendency to shrink in a direction away from the voice coil thereby creating voids or thinned sections of thermoplastic resin around the voice coil. As well understood by those skilled in the art, thermoplastic resin itself does not have good adhesion characteristics with respect to adhering to the actuator; rather, the over-molded resin acts as a mechanical connection for joining the voice coil to the actuator. Therefore, gaps or voids in the thermoplastic resin due to shrinkage reduce the ability of the thermoplastic resin to provide a stiff connection.

FIG. 1 illustrates one prior art approach in securing a voice coil to the actuator. The method shown in this figure is described in the U.S. Pat. No. 5,122,703 and is illustrated at FIG. 6(A) thereof. In this approach, the actuator arm 100 has a single dovetail 102 located behind the bearing of the actuator and an over-molded thermoplastic resin 106 circumferentially encapsulates the outside diameter of the voice coil 104 with remaining portions of the over-molded resin 106 forming a border that encapsulates the dovetail 102. The sole joint created by the lone dovetail behind the bearing of the actuator is not a robust design and allows the voice coil and over-molded resin to displace from the dovetail 102 in micro-movements about the joint thereby resulting in a loss of stiffness. The relatively thin border of plastic resin along the outside diameter of the voice coil does not provide the required structural support to ensure the voice coil is sufficiently integrated into the actuator.

FIG. 2 illustrates another prior art approach wherein actuator 110 includes two integral yoke arms 112 which extend away from the proximal or rear portion of the actuator body. An over-molded resin 116 then encapsulates both of the yoke arms as well as the voice coil 114. The integral yoke arms increase overall stiffness as compared to the prior art approach of FIG. 1; however, by totally encapsulating the yoke arms, the thermoplastic resin shrinks in all directions towards the yoke arms. Accordingly, the resin is drawn away from the outside diameter of the coil creating gaps between the plastic and the outside diameter of the coil. These gaps reduce the overall actuator stiffness FIG. 3 illustrates another example of a prior art approach in which an actuator 120 includes a pair of yoke arms 122, and a voice coil 124 is simply glued to the corresponding inner surfaces of the yoke arms. While the glue may provide good contact between the yoke arms and the coil, the glue may become soft at upper ranges of disk drive operating temperatures. The softening glue reduces stiffness of the actuator by allowing micro movements of the voice coil.

Another prior art approach as shown in FIG. 4 is to provide an actuator 128 with a plurality of teeth or curved protrusions on the inner surfaces of the yoke arms 130. These protrusions break up the normally smooth inner surface of the yoke arms thereby providing a greater surface area for the thermoplastic resin (not shown) to attach. However, even with the curved protrusions/teeth, a problem still exists in shrinkage of the plastic resin in a direction away from the yoke arms thereby reducing overall stiffness of the actuator.

Yet another prior art approach for attachment of a voice coil to an actuator is shown in the actuator 136 of FIG. 5. This approach requires the drilling of holes 140 in the yoke arms 138. The thermoplastic resin (not shown) fills the holes 140 thereby providing a locking feature to secure the voice coil (not shown). One distinct disadvantage in this approach is that the holes drilled in the yoke arms require a separate drilling operation which thereby increases the complexity of manufacturing, as well as potentially introducing contamination in a disk drive by small burrs or debris which may not be properly cleaned from the actuator prior to assembly of the disk drive.

One object of the present invention is to provide positive locking or positive retention features on the back end structure of an actuator which allows attachment of the voice coil without sacrificing or degrading stiffness of the actuator assembly. Another object of the present invention is to provide an actuator which may incorporate positive locking features at a minimum cost. Yet another object of the present invention is to provide a means to attach the voice coil by thermoplastic resin which takes advantage of the resin's natural tendency to shrink upon cooling.

SUMMARY OF THE INVENTION

In accordance with the present invention, an actuator assembly is provided which incorporates positive locking protrusions or positive retention features for attaching the voice coil to the actuator. In a preferred embodiment of the present invention, an actuator body is provided which may be manufactured in an extrusion process. The actuator body includes a pair of yoke arms extending from the back end or rear portion of the actuator body. Each of the yoke arms has a plurality of positive locking or positive retention features which enhance a thermoplastic resin's ability to join the yoke arms to a voice coil. Through a molding operation, the resin encapsulates the outer edges or diameter of the voice coil and inner surfaces of the yoke arms. The positive retention features are spaced along the inner surfaces of the yoke arms and incorporate protrusions having compound curved shapes. One of the curved areas on the features is a reverse or inward facing edge. Because the over-molded resin has a tendency to tightly shrink around the positive retention features of compound curved shapes, shrinkage therefore occurs in multiple directions. Structural rigidity and strength of the connection is therefore enhanced between the yoke arms and the over molded resin.

The positive retention features/protrusions extend away from the inner surfaces of the yoke arms toward a central gap where the voice coil is positioned. The positive retention protrusions each preferably include a neck portion and an enlarged end or head portion. The enlarged end portions have a curved shape which resembles a dovetail. The outer edge of each of the positive retention protrusions can be separately identified as including an outward facing edge section and a pair of reverse/inward facing edge sections. One way to conceptually define the reverse/inward facing edge sections is to describe them as being those points along the outer edges of the protrusions which generally face towards the inner surfaces of the yoke arms. Alternatively, the reverse facing edge sections can be defined as points along the outer edges of the positive retention features wherein a line drawn normal to each point results in the line intersecting with the inner surfaces of the yoke arm. The outward facing edge sections generally face away from the inner surfaces of the yoke arms and toward the central gap where the voice coil is positioned. These outward facing sections may be defined as those points along the outer edges of the protrusions wherein a line drawn normal to each point results in the line not intersecting the inner surfaces of the yoke arms.

One particular advantage of the present invention is that the positive retention or positive locking features may be extruded with the actuator body and therefore need not be separately attached or constructed. Accordingly, the manufacturing process for making the actuator is simplified thus reducing costs. As mentioned above with respect to the prior art approach of drilling holes in the yoke arms, creating positive retention features by drilling raises manufacturing costs as well as introducing contamination issues.

When the over-molded resin begins to cool after the molding process has allowed the resin to flow between the voice coil and actuator body, the resin will shrink in the multiple directions surrounding the positive retention features thereby providing a mechanically strong and stiff connection. The areas of resin surrounding the reverse facing edge sections particularly enhance the stiffness of the connection because the resin is shrinking in a direction that causes the resin structure as a whole to remain locked against the positive retention features which themselves are integrally formed with the actuator body.

Other features and advantages of the present invention will become apparent from review of the following detailed description taken in conjunction with the drawings.

BRIEF DESCRIPTION OF THE DRAWINGS

FIGS. 1–5 illustrate various prior art approaches in attachment of a voice coil to an actuator;

FIG. 6 is a perspective view of an actuator body which incorporates the positive retention features of the present invention;

FIG. 7 is a fragmentary enlarged plan view illustrating the positive retention features on corresponding yoke arms of the actuator body;

FIG. 8 is another fragmentary plan view further illustrating a voice coil attached to the actuator body by an over-molded resin;

FIG. 9 is a cross-sectional view taken along line 9—9 of FIG. 8 showing how the over-molded resin flows around the positive retention features;

FIG. 10 is a greatly enlarged plan view of a representative positive retention feature; and FIG. 11 is another greatly enlarged plan view of a pair of representative positive retention features, such as those identified in FIG. 7, illustrating the manner in which the over-molded resin shrinks around the positive retention features thereby providing a mechanically strong and stiff connection.

DETAILED DESCRIPTION

FIG. 6 illustrates the positive retention features of the present invention incorporated within a standard actuator body 10. The actuator body 10 includes an integrally extruded base 12, actuator arms 14, and yoke arms 20. As well understood by those skilled in the art, a complete actuator assembly would further include a suspension (not shown) for each arm 14, a slider (not shown) mounted to each suspension, and one or more read/write heads (not shown) mounted to each slider. Each of the actuator arms 14 of the type shown in FIG. 6 include an opening 18 which may receive a corresponding swage plate (not shown) for connection of the actuator arms to their respective suspensions. A central bore hole 16 is formed in the base 12, and the actuator body 10 rotates about a bearing (not shown) which is mounted within the bore hole 16. The pair of yoke arms 20 extend angularly away from the base 12 and may be further defined as including respective base sections 22 which attach to the base 12, and respective arm sections 23 which extend away from the base 12. A continuous web 24 may interconnect the base sections 22. The positive retention features 26 are mounted on the inner surfaces of the respective yoke arms. The positive retention features may be spaced along the inner surfaces of the yoke arms, and may be sized to provide an optimal interface for interconnection of the over molded resin.

While a particular type of actuator body is illustrated, it shall be understood that the positive retention features of the present invention may be incorporated within any number of different type of actuator designs which at least include a pair of yoke arms positioned at the back end or rear part of the actuator body.

Referring also now to FIGS. 7–10, the positive retention features 26 may be further defined as including a neck area or portion 30 and an enlarged end portion 32 which extends from the neck 30. The edges of the positive retention features 26 may be defined in separate sections to include a pair of reverse/inward facing edges 34 and an outward facing edge 36 interconnecting the pair of inward facing edges. The edges 34 may be defined as those points along these edges which allow a line 38 to intersect the inner surface 42 of the yoke arms when the line 38 is drawn normal to the points. The significance of these inward facing sections 34 are discussed below with respect to the manner in which the over-molded resin shrinks around the positive retention features 26. The outward facing edges 36 would be those points along this edge which allow a line 44 to be drawn normal to these points without intersecting the inner surfaces 42.

Referring specifically to FIGS. 8 and 9, the over-molded resin 46 is shown which interconnects the actuator body to the voice coil 48. The particular pattern shown for the resin 46 simply represents one way in which to secure the voice coil and to provide for mounting of other components to the actuator. Therefore, the present invention should not be considered limited by the particular manner in which the over-molded resin arranges with respect to the voice coil. In an injection molding process during assembly of the actuator, the resin flows to fill the gaps or voids between the voice coil and the actuator. The voice coil is centrally located between the yoke arms and is at least partially encapsulated within the resin around its outer diameter. Preferably, the yoke arms extend to a length which results in the voice coil having approximately 270° of the outer diameter bounded by the yoke arms and the web interconnecting the yoke arms. As shown in FIG. 9, it is preferable to have the over molded resin completely encapsulate the features 26.

Referring to FIG. 11, the directional arrows indicate the manner in which the thermoplastic resin will shrink around the positive retention features. For clarity, the directional arrows are only shown around one positive retention feature. Because of the multi-directional shrinkage of the resin around the positive retention features, strength of the connection between the voice coil and actuator is increased because mechanical locking of the resin to the positive retention features is not structurally weak along any particular axis or direction. In other words, the shapes of the positive retention features which facilitate the multi-directional shrinkage of the resin around the features ensures there is not a particular area or section along the yoke arms which does not have a positive locking arrangement with the resin. Thus, any induced stresses or bending moments placed upon the actuator in a particular direction will allow the actuator to resist micro-movement of the voice coil since there are multiple locking structures having strength in many directions. Furthermore, the shrinkage of the resin around the positive retention features in the manner shown in FIG. 11 also limits the amount of resin which will be pulled away from the voice coil as the resin shrinks towards the actuator. As shown in FIG. 11, the thermoplastic resin which flows between the positive retention features may also be defined as forming a plurality of interlocking resin features which fill the spaces between the plurality of positive retention features. Accordingly, FIG. 11 also may described as illustrating a plurality of interlocking resin features in which each include a neck portion 60 and an enlarged end or head portion 62. Accordingly, the positive retention features and the plurality of interlocking resin features form a combination of structural components which increase stiffness, and thereby inhibit micro-movement of the voice coil with respect to the actuator despite potential multiple stresses or bending moments which may be placed upon the actuator.

From the figures it can be seen that the positive retention features 26 do not necessarily have to be of identical shape, and the particular shape of each of the retention features may be modified as necessary to provide the desired level of interface with the over-molded resin. Although no positive retention features 26 are illustrated at the web 24, it is also possible to place one or more positive retention features 26 along this area as well.

By the foregoing invention, positive retention of the over-molded resin to the actuator body is achieved in a manner which maintains structural integrity as well as to utilize the inherent shrinkage properties of plastic in favor of enhancing structural rigidity of the actuator. Because improved stiffness is achieved with the attachment of the voice coil to the actuator, the disk drive may achieve higher drive capacity.

The particular design of the positive retention features allows the features to be integrally extruded with the actuator body thereby eliminating the need for additional processing steps to incorporate the positive retention features.

The yoke arms which extend approximately 270° around the voice coil diameter thereby constrain the voice coil in a more superior manner than the single dovetail approach in the prior art discussed above.

Since thermoplastic resin does not have any appreciable adhesion capability and relies primarily upon mechanical locking, the reverse facing edges on the positive retention features thereby use the mechanical locking capability of the plastic as means to enhance interconnection between the voice coil and the actuator.

By extruding the positive retention features within the same structure as the actuator body, the positive retention features may be incorporated in a more cost effective manner, as well as reducing contamination issues which may occur with drilled holes in the actuator body.

The foregoing invention has been described in reference to a particular embodiment thereof; however, various other changes and modifications may be made within the spirit and scope of the invention.

What is claimed is:

1. In an actuator used in a computer disk drive, the improvement comprising:
a pair of yoke arms attached to the actuator;
means extending away from inner surfaces of the yoke arms for positively retaining an over-molded resin section, said means for positively retaining including a plurality of reverse facing edges wherein the resin section resides in gaps between the means for positively retaining and resides beyond at least one means for positively retaining and said resin section shrinks around the means for positively retaining in a direction toward the reverse facing edges thereby enhancing the rigidity of a connection between the resin and the means for positively retaining.

2. An actuator, as claimed in claim 1, wherein:
said means for positively retaining includes a plurality of positive retention features spaced along inner surfaces of said pair of yoke arms, and said plurality of reverse facing edges being disposed along said positive retention features.

3. An actuator, as claimed in claim 2, wherein:
individual positive retention features of said plurality of positive retention features each include an enlarged end portion and a neck portion interconnecting said enlarged end portion to a corresponding inner surface of one of said pair of yoke arms.

4. An actuator, as claimed in claim 3, wherein:
said reverse facing edges are disposed partly along said enlarged end portions.

5. An actuator body comprising:
an actuator base having a bore hole provided therethrough;
at least one actuator arm attached to said base;
a pair of yoke arms extending angularly away from the actuator base;
a plurality of protrusions integrally formed with said pair of yoke arms and extending away from inner surfaces of said yoke arms, said protrusions each having a reverse facing edge;
a voice coil; and
an over-molded section interconnecting said voice coil to said yoke arms, said over-molded section being made of a thermoplastic resin which extends in gaps between said protrusions and beyond at least one protrusion, and wherein the over-molded section shrinks around said protrusions in a direction toward said reverse facing edges of said protrusions.

6. An actuator body, as claimed in claim 5, wherein:
each of said plurality of protrusions further include an enlarged end portion and a neck portion interconnecting said enlarged end portion to a corresponding inner surface of one yoke arm of said pair of yoke arms.

7. An actuator body comprising:
an actuator base having a bore hole provided therethrough;
at least one actuator arm attached to said base;
a pair of yoke arms extending angularly away from the actuator base;
a plurality of means extending away from inner surfaces of the yoke arms for positively retaining an over molded resin section, said means for positively retaining having a plurality of reverse facing edges;
a voice coil; and
said over molded section interconnecting said voice coil to said yoke arms, said over-molded section being made of a thermoplastic resin which extends in gaps between said protrusions and beyond at least one protrusion, and wherein the over-molded section shrinks around said means for positively retaining in a direction toward said reverse facing edges.

8. An actuator body, as claimed in claim 7, wherein:
said means for positively retaining includes a plurality of positive retention features spaced along inner surfaces of said pair of yoke arms, and said plurality of reverse facing edges being disposed along said positive retention features.

9. An actuator body, as claimed in claim 8, wherein:
said plurality of positive retention features each include an enlarged end portion and a neck portion interconnecting said enlarged end portion to a corresponding inner surface of one yoke arm of said pair of yoke arms.

10. A method of attaching a voice coil to an actuator body of an actuator, said method comprising the steps of:
providing an actuator body with a pair of yoke arms, and a plurality of positive retention features integrally formed with the yoke arms and extending away from the yoke arms and spaced along inner surfaces of each of said pair of yoke arms;
positioning a voice coil between the pair of yoke arms;
introducing a thermoplastic resin between said yoke arms and said voice coil, said thermoplastic resin flowing in gaps between said yoke arms and flowing around said positive retention features forming a plurality of interlocking resin features, said resin further flowing beyond at least one positive retention feature, and said resin shrinking around said positive retention features thereby providing a connection between said voice coil and said actuator arm.

11. A method, as claimed in claim 10, wherein:
said plurality of positive retention features each include an enlarged end portion, and a neck portion interconnecting the enlarged end portion to corresponding inner surfaces of the yoke arms.

12. A method, as claimed in claim 11, wherein:
said plurality of interlocking resin features each have a neck portion and an enlarged head portion, said interlocking resin features being placed in a complementary locking arrangement with respect to said positive retention features.

13. In an actuator used in a computer disk drive, the improvement comprising:
a pair of yoke arms integral with the actuator;
a plurality of means disposed along inner surfaces of each of said yoke arms for interlocking an over-molded resin section to said actuator, said means for interlocking including a plurality of positive retention features integrally formed with the yoke arms and extending away from the inner surfaces of the yoke arms, said means for interlocking further including a complementary plurality of interlocking resin features formed by resin flowing between said plurality of positive retention features and beyond at least one positive retention feature, and the resin subsequently shrinking around said positive retention features, and wherein said means for interlocking thereby enhances rigidity of a connection between the over-molded resin and the actuator.

14. An actuator, as claimed in claim 13, wherein:
each of said plurality of positive retention features includes a first neck portion and a first enlarged end portion attached to said first neck portion and each of said plurality of interlocking resin features includes a second neck portion and a second enlarged end portion connected to said second neck portion, said first neck portions of said plurality of positive retention features being disposed adjacent said second enlarged end portions of said plurality of interlocking resin features, and said first enlarged end portions of said plurality of positive retention features being disposed adjacent said second neck portions of said plurality of interlocking resin features.

* * * * *